(12) United States Patent
Chang et al.

(10) Patent No.: US 8,456,470 B2
(45) Date of Patent: Jun. 4, 2013

(54) LIGHTING ENVIRONMENT SIMULATION SYSTEM AND METHOD

(75) Inventors: Chih-Kuang Chang, Taipei Hsien (TW); Xin-Yuan Wu, Shenzhen (CN); Xiao-Chao Sun, Shenzhen (CN); Min Wang, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 775 days.

(21) Appl. No.: 12/690,259

(22) Filed: Jan. 20, 2010

(65) Prior Publication Data

US 2011/0134121 A1     Jun. 9, 2011

(30) Foreign Application Priority Data

Dec. 8, 2009   (CN) .......................... 2009 1 0311058

(51) Int. Cl.
   *G06T 15/00*     (2011.01)
(52) U.S. Cl.
   USPC ............................ 345/426; 345/419; 345/584

(58) Field of Classification Search
   USPC ........................................ 345/419, 426, 584
   See application file for complete search history.

(56) References Cited

U.S. PATENT DOCUMENTS

| | | | |
|---|---|---|---|
| 6,771,264 B1 * | 8/2004 | Duluk et al. .................. | 345/426 |
| 7,095,409 B2 * | 8/2006 | Cook et al. ................... | 345/426 |
| 7,098,925 B1 * | 8/2006 | Lake et al. .................... | 345/584 |
| 8,018,454 B2 * | 9/2011 | Brabec et al. ................. | 345/419 |
| 8,115,767 B2 * | 2/2012 | Stich ............................. | 345/426 |
| 8,243,071 B2 * | 8/2012 | Wang et al. ................... | 345/426 |

* cited by examiner

*Primary Examiner* — Phu K Nguyen
(74) *Attorney, Agent, or Firm* — Altis Law Group, Inc.

(57) ABSTRACT

A lighting environment simulation system and method meshes a three-dimensional (3D) model of an object into a plurality of triangles, simulates lighting effects for the meshed 3D model, and determines an actual display color for each triangle of the meshed 3D model under the simulated lighting effects. The system and method further displays the meshed 3D model to a display device according to actual display colors and coordinates of all the triangles of the meshed 3D model.

16 Claims, 12 Drawing Sheets

LIGHTING ENVIRONMENT SIMULATION SYSTEM AND METHOD

BACKGROUND

1. Technical Field

Embodiments of the present disclosure relates to three-dimensional (3D) measurement technology, and more particularly, to a lighting environment simulation system and method applied in 3D measurement field.

2. Description of Related Art

If a 3D measurement system does not provide a lighting environment for objects to be measured, the system may only obtain rough surface information of the objects, as illustrated in a model of a mobile phone shell shown in FIG. 11. In the mobile phone shell, certain details, such as exact contours of the mobile phone, may be inaccurate. Detailed characteristics of the contours and other elements of the mobile phone shell may be difficult to be measured without lighting assistance.

What is needed, therefore, is an improved system and method to overcome the aforementioned problem.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
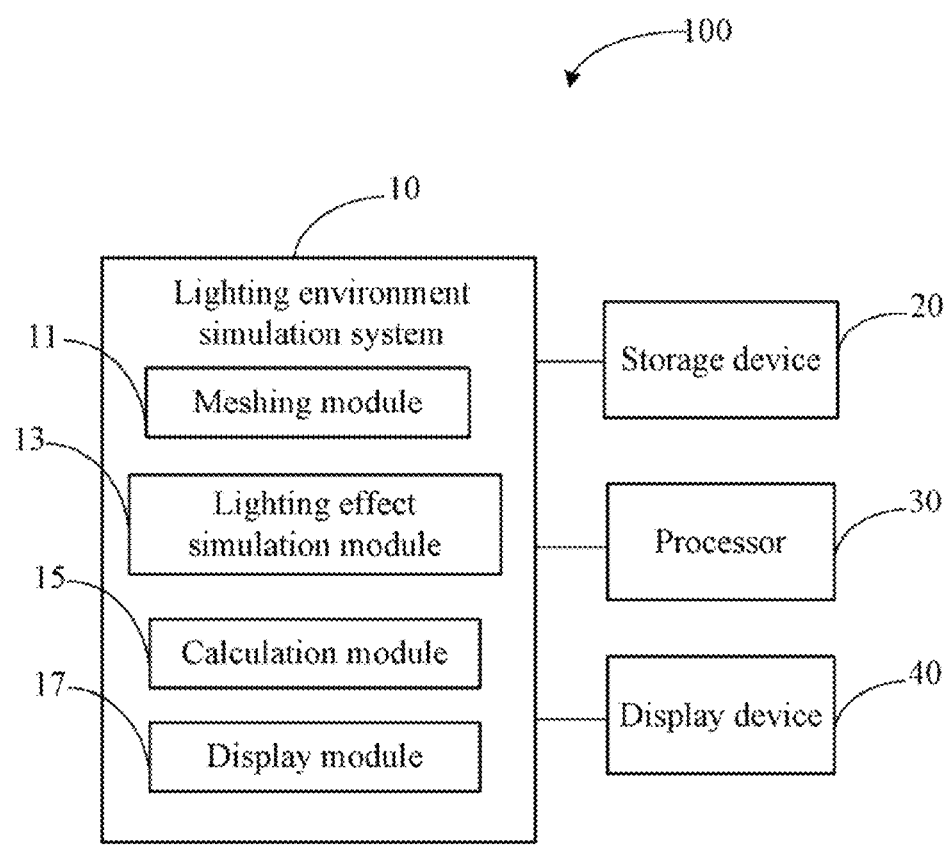
FIG. 1 is a block diagram of one embodiment of a data processing device comprising a lighting environment simulation system.

FIG. 1 is a block diagram of one embodiment of a data processing device 100 comprising a lighting environment simulation system 10. In one embodiment, the lighting environment simulation system 10 creates a triangle mesh of a three-dimensional (3D) object (e.g., a 3D model of a mobile phone shell), simulates lighting effects for the triangle mesh, determines an actual display color for each triangle of the triangle mesh under the simulated lighting effects, and displays the 3D object on a display device 40 of the data processing device 100 according to the actual display colors and coordinates of all the triangles of the triangle mesh of the 3D object.

As shown in FIG. 1, the lighting environment simulation system 10 includes a meshing module 11, a lighting effect simulation module 13, a calculation module 15, and a display module 17. One or more computerized codes of the modules 11-17 are stored in a storage device 20 of the data processing device 100, where a processor 30 of the data processing device 100 executes the one or more computerized codes, to provide one or more operations of the lighting environment simulation system 10. Depending on the embodiment, the data processing device 100 may be a computer or any other electronic device having data processing functions. The storage device 20 may be a smart media card, a secure digital card, or a compact flash card. It is understood that the storage device 20 also stores information of the 3D object, such as color information of the 3D object.

The meshing module 11 is operable to triangulate the 3D object into a plurality of triangles. A detailed description is given in FIG. 3.

The lighting effect simulation module 13 is operable to simulate lighting effects for the 3D object, including determining lighting parameters for the triangulated 3D object, such as a lighting range, a light source position, a lighting direction and light source intensity parameters. In one embodiment, the light source intensity parameters may include a lighting depth and attenuation coefficients of points on the lighting depth. A detailed description is given in FIG. 4.

The calculation module 15 is operable to determine an actual display color for each triangle of the 3D object according to an original color of the 3D object, an intersection angle between a light ray S along the lighting direction and a normal vector of the triangle, and a distance between the triangle and the light source position. A detailed description is given in FIG. 5.

The display module 17 is operable to project the 3D object onto the display device 40 according to coordinates and the actual display color of each triangle of the 3D object. A detailed description is given in FIG. 6.

Figure 2:
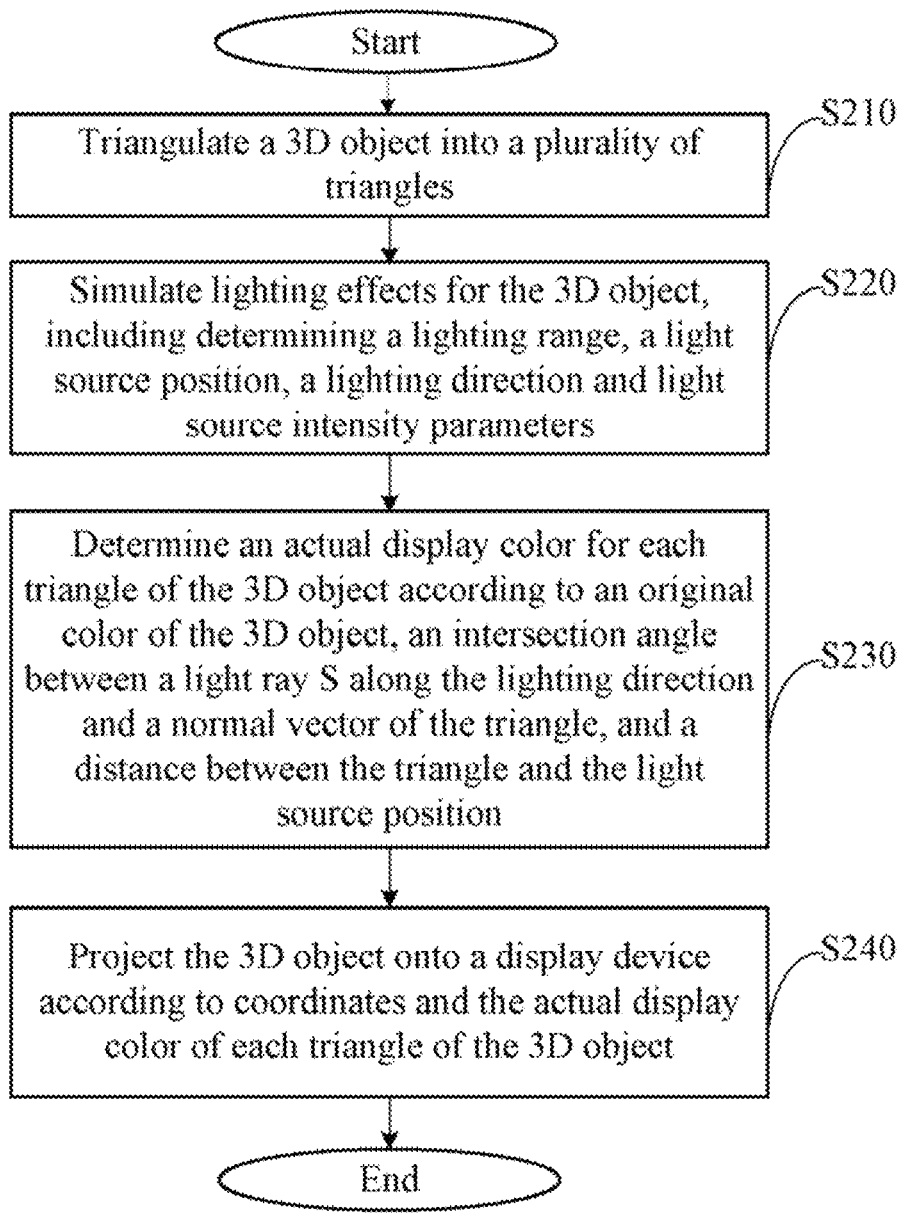
FIG. 2 is a flowchart of one embodiment of a method for simulating a lighting environment.

FIG. 2 is a flowchart of one embodiment of a method for simulating a lighting environment. Depending on the embodiment, additional blocks may be added, others removed, and the ordering of the blocks may be changed.

In block S210, the meshing module 11 triangulates the 3D object into a plurality of triangles. A detailed description is given in FIG. 3.

In block S220, the lighting effect simulation module 13 simulates lighting effects for the 3D object, including determining lighting parameters for the 3D object, such as a lighting range, a light source position, a lighting direction and light source intensity parameters. As mentioned above, the light source intensity parameters may include a lighting depth and attenuation coefficients of points on the lighting depth. A detailed description is given in FIG. 4.

In block S230, the calculation module 15 determines an actual display color for each triangle of the 3D object according to an original color of the 3D object, an intersection angle between a light ray S along the lighting direction and a normal vector of the triangle, and a distance between the triangle and the light source position. A detailed description is given in FIG. 5.

In block S240, the display module 17 projects the 3D object to the display device 40 according to coordinates and the actual display color of each triangle of the 3D object. A detailed description is given in FIG. 6.

Figure 3:
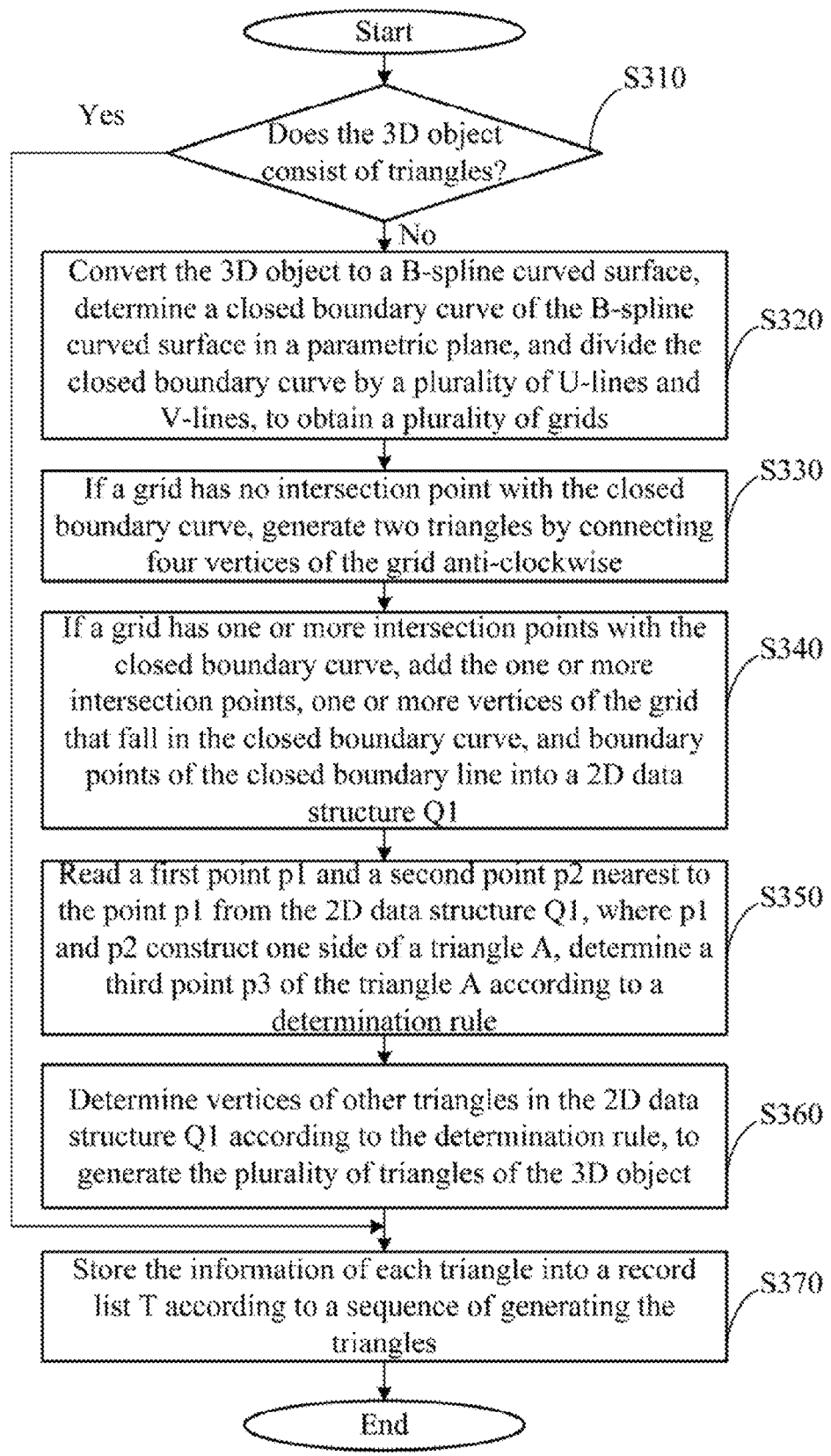
FIG. 3 is a detailed description of block S210 in FIG. 2.

FIG. 3 is a detailed description of block S210 in FIG. 2. Depending on the embodiment, additional blocks may be added, others removed, and the ordering of the blocks may be changed.

In block S310, the meshing module 11 reads the 3D object from the storage device 20, and determines that if the 3D object consists of triangles. If the 3D object consists of triangles, the procedure directly goes to S370. Otherwise, if the 3D object does not consist of triangles, the procedure goes to block S320.

Figure 7:
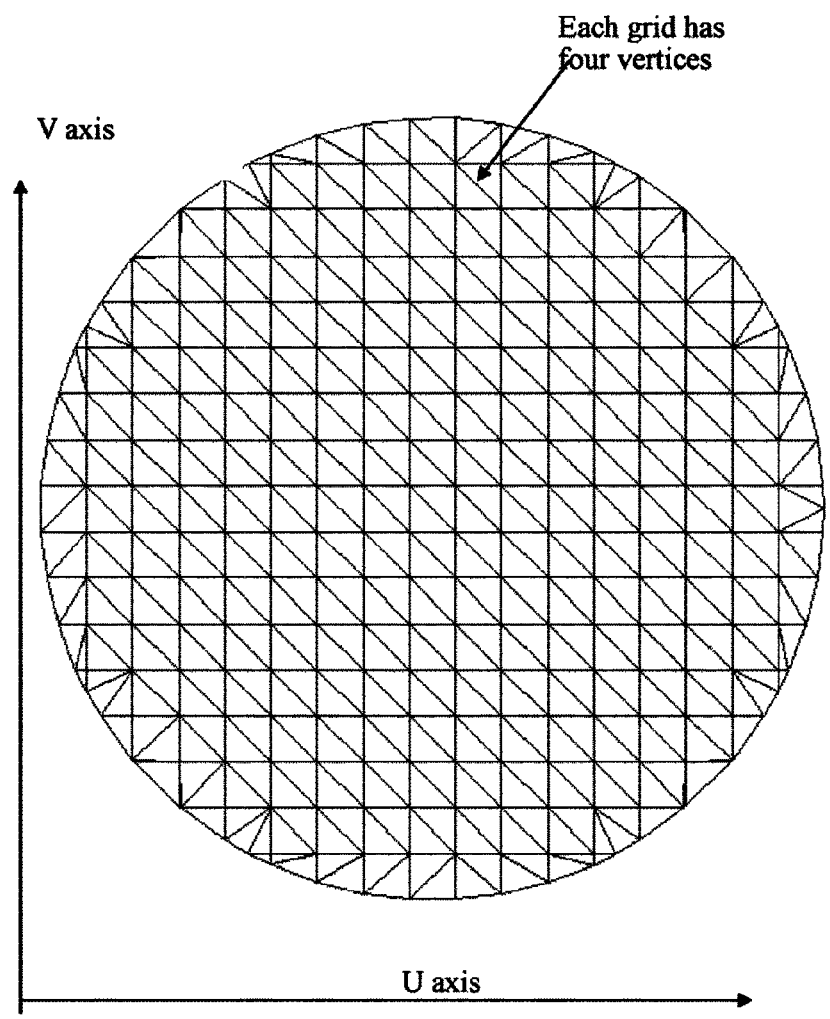
FIG. 7 and FIG. 8 illustrate triangulating a 3D object.

In block S320, the meshing module 11 converts the 3D object to a B-spline curved surface, determines a closed boundary curve of the B-spline curved surface in a parametric plane, and divides the closed boundary curve by a plurality of horizontal lines (hereinafter referred to "U-lines") and vertical lines (hereinafter referred to "V-lines"), to obtain a plurality of grids (as shown in FIG. 7).

Figure 8:
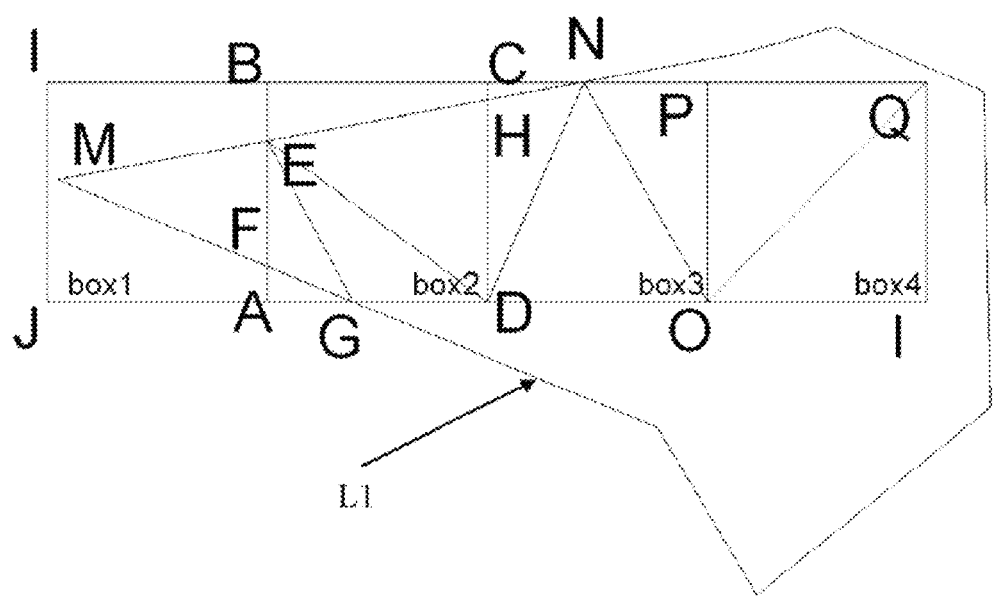

In block S330, if a grid has no intersection point with the closed boundary curve, the meshing module 11 generates two triangles by connecting four vertices of the grid anti-clockwise. For example, as shown in FIG. 8, four vertices "P," "Q," "I," and "O" of a grid "box4" all fall in the closed boundary curve L1, then the meshing module 11 generates two triangles "OQP" and "OIQ" by connecting the four vertices "P," "Q," "I," and "O" anti-clockwise.

In block S340, if a grid has one or more intersection points with the closed boundary curve, the meshing module 11 adds the one or more intersection points, one or more vertices of the grid which fall in the closed boundary curve, and boundary points of the closed boundary line into a two-dimensional (2D) data structure Q1. For example, as shown in FIG. 8, a boundary point "M" falls in a grid "box," and the grid "box1" has two intersection points "E" and "F" with the closed boundary curve L1. A vertex "D" of a grid "box2" falls in the closed boundary curve L1, and the grid "box2" has four vertices "E," "F," "C," and "G" with the closed boundary curve L1. Then, the meshing module 11 adds the points "M," "E," "F," "C," "D," and "G" into the 2D data structure Q1.

In block S350, the meshing module 11 reads a first point p1 and a second point p2 nearest to the point p1 from the 2D data structure Q1, where p1 and p2 construct one side of a triangle A. The meshing module 11 further determines a third point p3 of the triangle A according to a determination rule that there is no 2D point of the 2D data structure Q1 in a circumcircle of the triangle A consisted by the points p1, p2, and p3.

In block S360, the meshing module 11 determines vertices of other triangles in the 2D data structure Q1 according to the determination rule, to generate the plurality of triangles of the 3D object.

In block S370, the meshing module 11 stores the information of each triangle into a record list T according to a sequence of generating the triangles.

Figure 4:
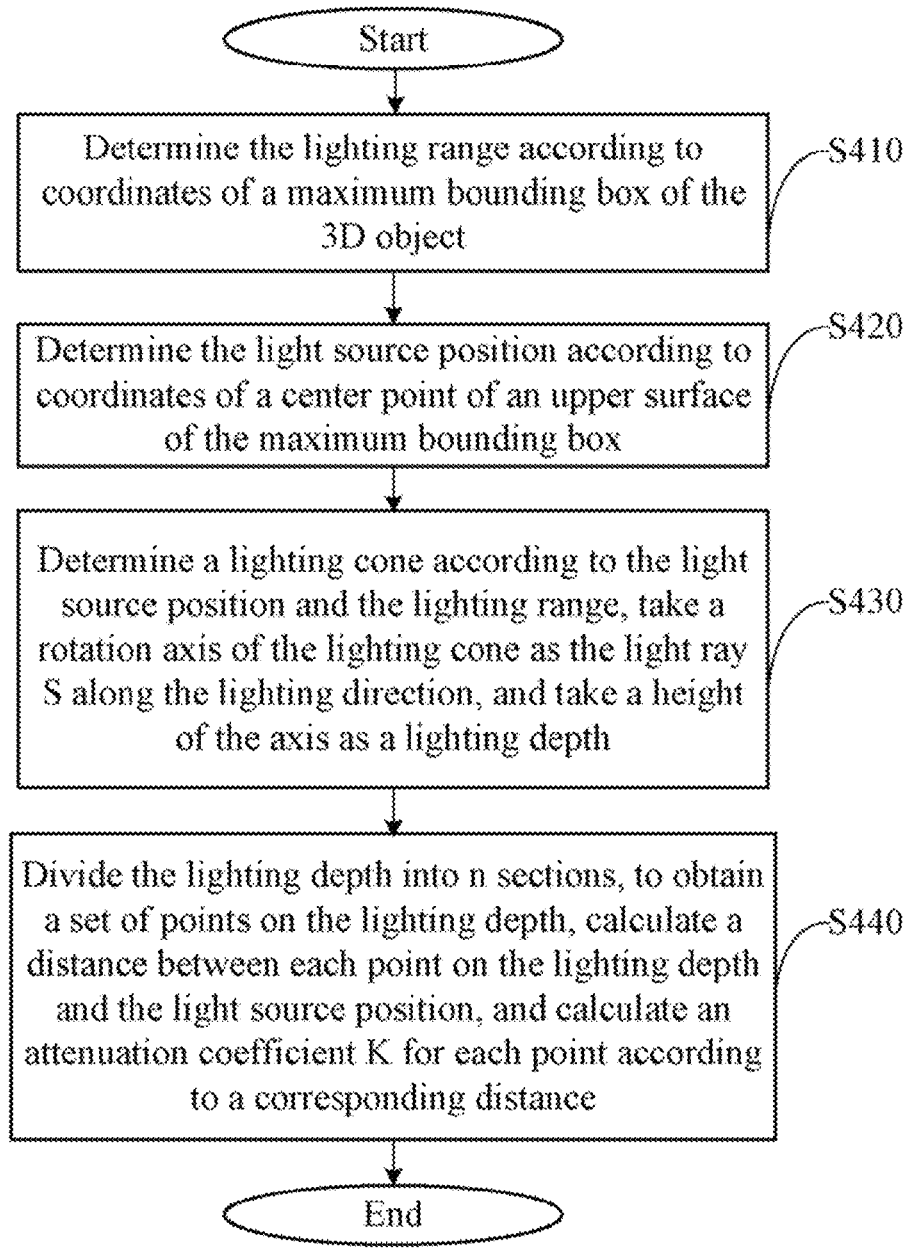
FIG. 4 is a detailed description of block S220 in FIG. 2.

FIG. 4 is a detailed description of block S220 in FIG. 2. Depending on the embodiment, additional blocks may be added, others removed, and the ordering of the blocks may be changed.

Figure 9:
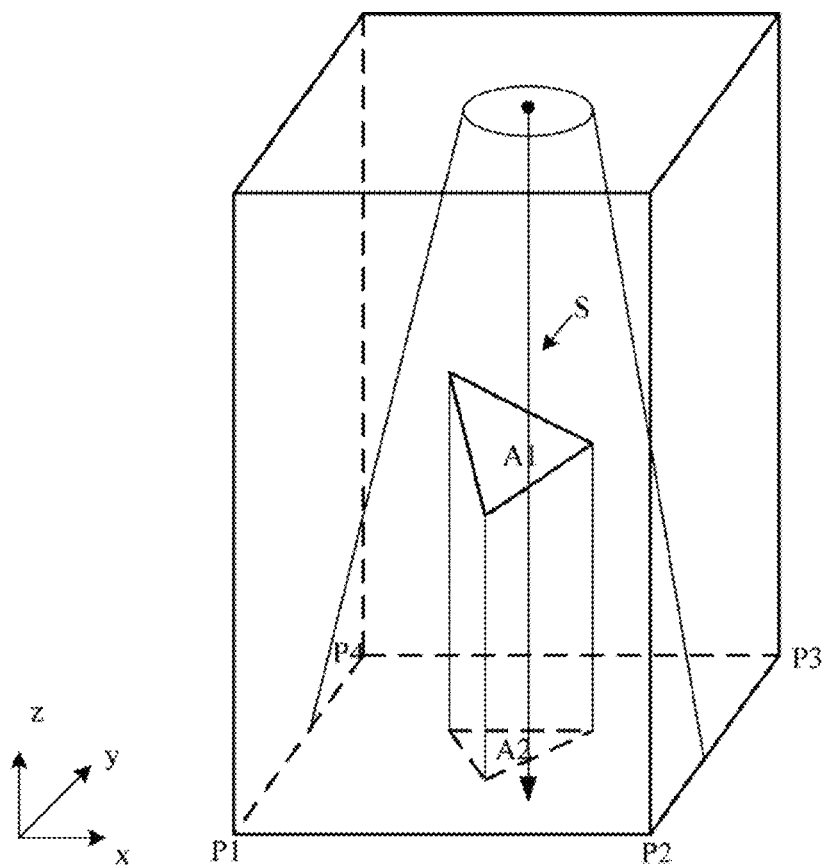
FIG. 9 illustrates configuring a lighting environment for the 3D object.

In block S410, the lighting effect simulation module 13 determines the lighting range according to coordinates of a maximum bounding box of the 3D object. For example, supposing the cuboid shown in FIG. 9 is the maximum bounding box of the triangulated 3D object, then the lighting range is defined by the cuboid.

In block S420, the lighting effect simulation module 13 determines the light source position according to coordinates of a center point of an upper surface of the maximum bounding box. For example, supposing coordinates of the center point of the upper surface of the cuboid in FIG. 9 is x1, y1, and z1) then the lighting effect simulation module 13 determines the light source position is (x1, y1, z1).

In block S430, the lighting effect simulation module 13 determines a lighting cone according to the light source position and the lighting range, takes a rotation axis of the lighting cone as the light ray S along the lighting direction, and takes a height of the rotation axis as the lighting depth. For example, as shown in FIG. 9, the lighting effect simulation module 13 takes the light source position as an original point and takes a distance between the upper surface and the lower surface of the maximum bounding box (i.e., the cuboid) as the height of the rotation axis to draw the lighting cone.

Figure 10:
FIG. 10 illustrates dividing a lighting depth.
Figure 11:
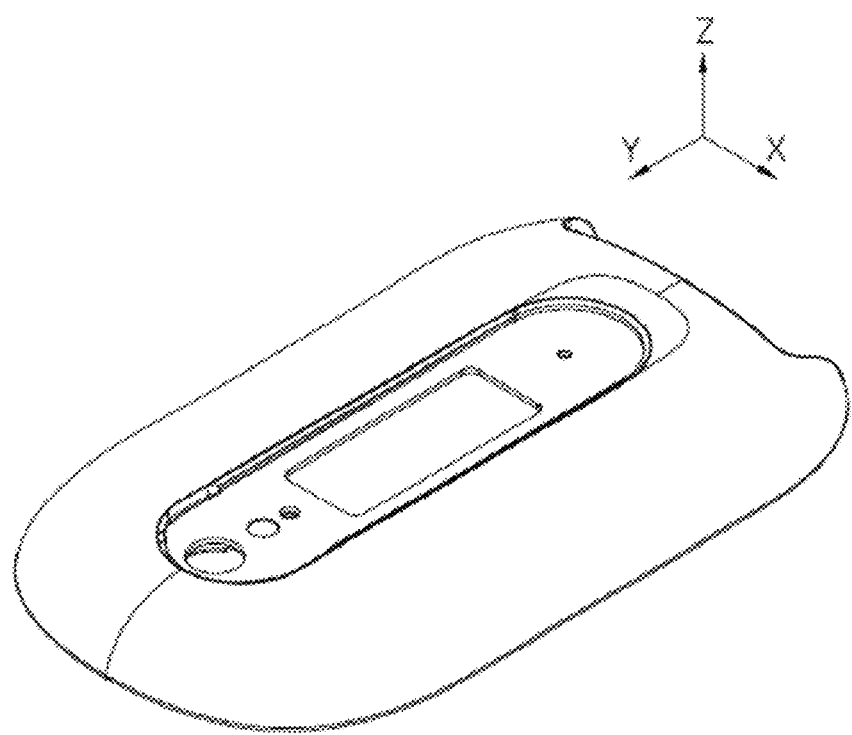
FIG. 11 illustrates a display result of the 3D object without lighting effects in prior art.

In block S440, the lighting effect simulation module 13 divides the lighting depth into n sections to obtain a set of points on the lighting depth, calculates a distance between each point on the lighting depth and the light source position, and calculates an attenuation coefficient K for each point according to a corresponding distance. For example, as shown in FIG. 10, supposing the line segment G1G5 is the lighting depth, where the endpoint G1 is the light source position. The lighting effect simulation module 13 divides the lighting depth G1G5 to four sections, to obtain the set of points G1, G2, G3, G4, and G5. The lighting effect simulation module 13 further calculates an attenuation coefficient K for the points G1, G2, G3, G4, and G5, where the attenuation coefficient K is a ratio of a distance between the point and the light source position to the lighting depth. For example, $K(G1)=0$, $K(G2)=|G1G2|/|G1G5|$, $K(G3)=|G1G3|/|G1G5|$, $K(G4)=|G1G4|/|G1G5|$, and $K(G5)=|G1G5|/|G1G5|=1$, where "| |" represents an absolute value. For example, "|G1G2|" represents the absolute value of "G1G2."

Figure 5:
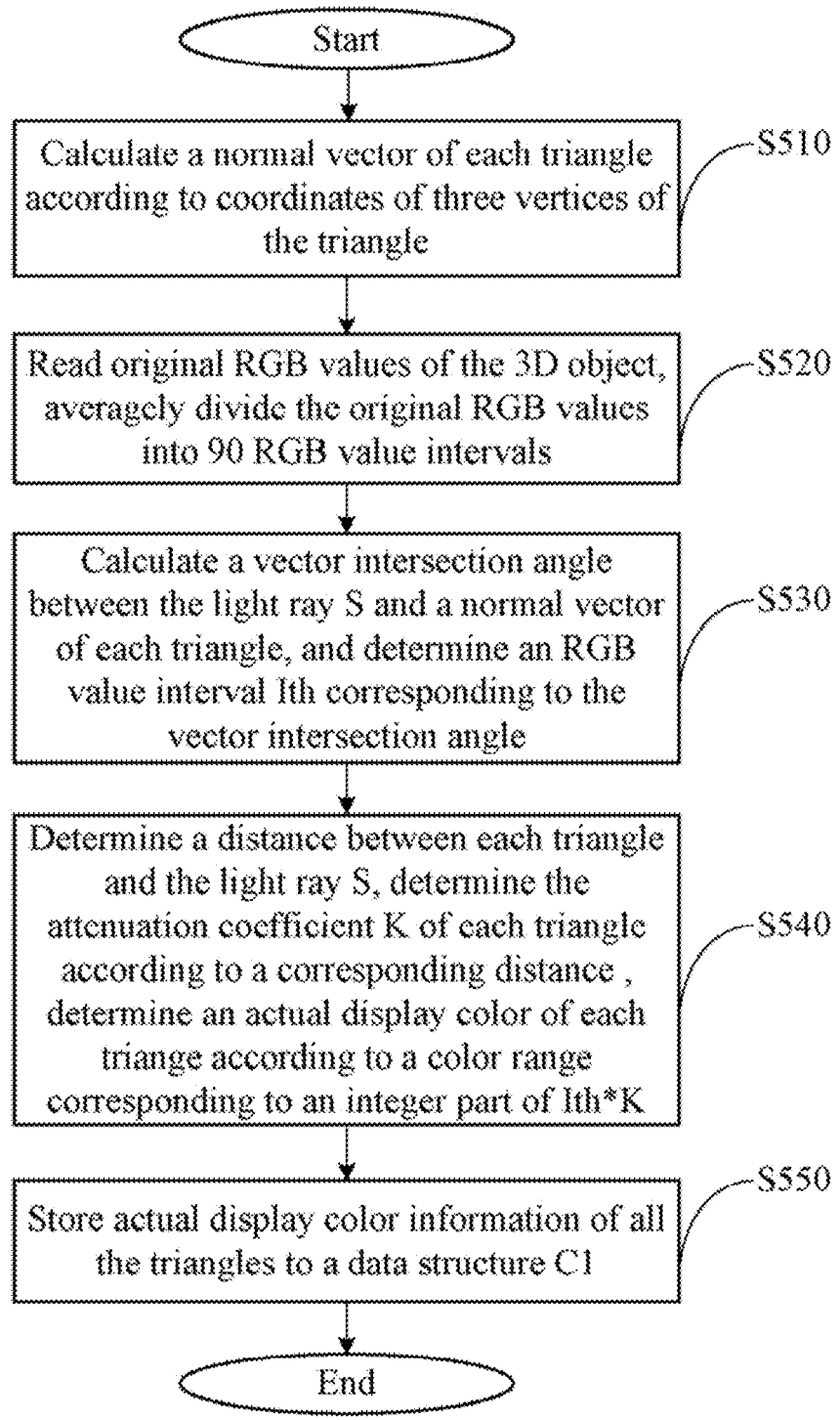
FIG. 5 is a detailed description of block S230 in FIG. 2.

FIG. 5 is a detailed description of block S230 in FIG. 2. Depending on the embodiment, additional blocks may be added, others removed, and the ordering of the blocks may be changed.

In block S510, the calculation module 15 calculates a normal vector of each triangle of the 3D object according to coordinates of three vertices of the triangle. For example, supposing three vertices of the triangle A are v0, v1, and v2, then the calculation module 15 calculates a normal vector N1 of the triangle A as follows: $N1=(v1-v0)$ cross $(v2-v0)$, where "cross" represents the cross product.

In block S520, the calculation module 15 reads original red, green, and blue (RGB) values of the 3D object, and averagely divides the original RGB values into 90 RGB value intervals, so that each vector intersection angle corresponds to a corresponding RGB value interval. For example, supposing an original color of the 3D object is yellow, then the calculation module 15 divides RGB values of the yellow color to 90 RGB value intervals, to obtain 90 RGB values from light yellow to deep yellow. It is understood that if a normal vector intersection angle between an object and a light source is more than 90 degrees, then the object is not visible by eyes, so that the original RGB values of the 3D object are divided to 90 RGB value intervals for following use.

In block S530, the calculation module 15 calculates a vector intersection angle between the light ray S and a normal vector of each triangle, and determines a RGB value interval Ith corresponding to the vector intersection angle. For example, if the vector intersection angle a1 between the light ray S and the normal vector N1 of the triangle A is 30.5 degrees, then the vector intersection angle a1 corresponds to the $30^{th}$ (i.e., Ith=$30^{th}$) RGB value interval.

In block S540, the calculation module 15 determines a distance between each triangle and the light ray S, determines the attenuation coefficient K of each triangle according to a corresponding distance, and determines an actual display color of each triangle according to a RGB value interval corresponding to an integer part of Ith*K. For example, if the distance between the triangle A and the light ray S is 8.1 cm, the lighting depth is 10 cm, then the attenuation coefficient K of the triangle A is 0.81, and int(30*0.81)=24. That is, an actual display color of the triangle A falls in the $24^{th}$ RGB value interval.

In block S550, the calculation module 15 stores actual color information of all the triangles of the 3D object into a data structure C1.

Figure 6:
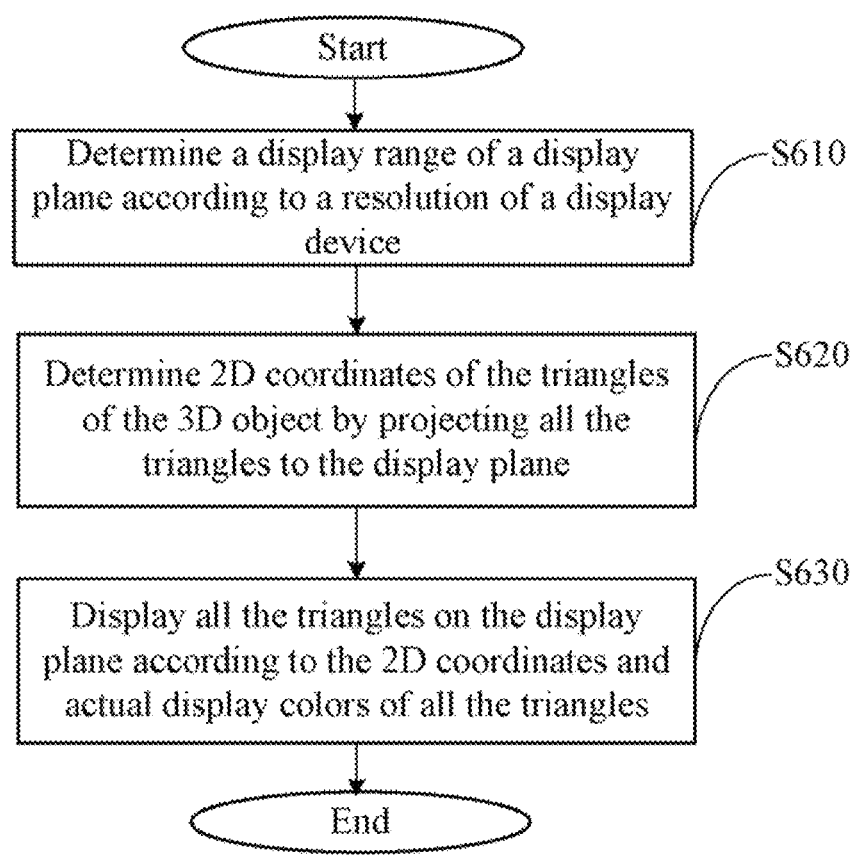
FIG. 6 is a detailed description of block S240 in FIG. 2.

FIG. 6 is a detailed description of block S240 in FIG. 2. Depending on the embodiment, additional blocks may be added, others removed, and the ordering of the blocks may be changed.

In block S610, the display module 17 determines a display range of a display plane according to a resolution of the display device 40. For example, if the resolution of the display device 40 is 1024*768 pixels, the display module 17 determines the display range of the display plane is a rectangle defined by four pixel points P1(0,0), P2(1023,0), P3(1023, 767), and P4(0, 767) (as shown in FIG. 9).

In block S620, the display module 17 determines 2D coordinates of all the triangles of the 3D object by projecting all the triangles to the display plane. For example, as shown in FIG. 9, a triangle A1 of the 3D object is projected to the display plane, to obtain a plane triangle A2. If any obtained plane triangle exceeds the display range of the display plane, the display module 17 may reduce 2D coordinates of all triangles by the same proportion, such as 90%, so as to make sure all obtained plane triangle can be displayed within the display range.

Figure 12:
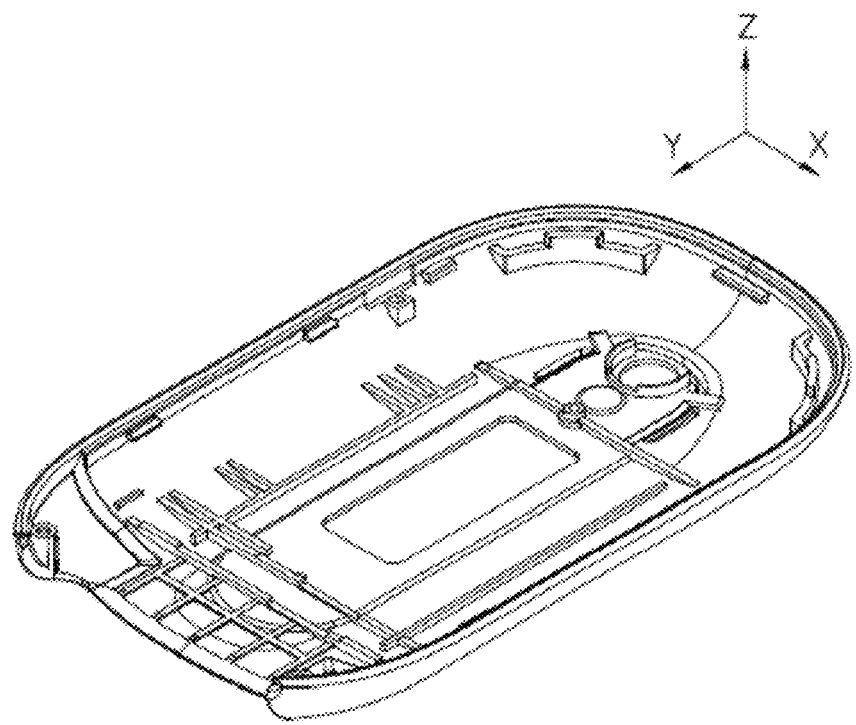
FIG. 12 illustrates a display result of the 3D object under simulated lighting effects.

In block S630, the display module 17 displays all the triangles of the 3D object on the display plane according to the 2D coordinates and actual display colors of all the triangles. For example, FIG. 12 illustrates a 3D model of a mobile phone shell displayed under the simulated lighting effects.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A lighting environment simulation method implemented in a data processing device, the method comprising:
    (a) triangulating a three-dimensional (3D) model of an object obtained from a storage device into a plurality of triangles;
    (b) simulating a lighting environment for the 3D model, comprising: (b1) determining a lighting range according to coordinates of a maximum bounding box of the 3D model, (b2) determining a light source position according to coordinates of a center point of an upper surface of the maximum bounding box, (b3) determining a lighting cone according to the light source position and the lighting range, taking a rotation axis of the lighting cone as a light ray S along a lighting direction, and taking a height of the rotation axis as a lighting depth; (b4) dividing the lighting depth into n sections to obtain a set of points on the lighting depth; (b5) calculating a distance between each point on the lighting depth and the light source position; and (b6) calculating an attenuation coefficient K of each point according to a corresponding distance;
    (c) determining an actual display color for each triangle of the 3D model according to an original color of the 3D model, an intersection angle between a light ray S along the lighting direction and a normal vector of the triangle, and a distance between the triangle and the light source position; and
    (d) projecting the 3D model onto a display device according to coordinates and the actual display color of each triangle of the 3D model.

2. The method as claimed in claim 1, wherein step (a) comprises:
    (a1) converting the 3D model to a B-spline curved surface, determining a closed boundary curve of the B-spline curved surface in a parametric plane, and dividing the closed boundary curve by a plurality of horizontal lines and vertical lines, to obtain a plurality of grids;
    (a2) if a grid has no intersection point with the closed boundary curve, generating two triangles by connecting four vertices of the grid anti-clockwise;
    (a3) if a grid has one or more intersection points with the closed boundary curve, adding the one or more intersection points, one or more vertices of the grid which fall in the closed boundary curve, and boundary points of the closed boundary line into a 2D data structure Q1;
    (a4) reading a first point p1 and a second point p2 nearest to the point p1 from the 2D data structure Q1, where p1 and p2 construct one side of a triangle A, and determining a third point p3 of the triangle A according to a determination rule that there is no 2D point of the 2D data structure Q1 in a circumcircle of the triangle A; and
    (a5) determining vertices of other triangles in the 2D data structure Q1 according to the determination rule, to generate the plurality of triangles of the 3D model.

3. The method as claimed in claim 2, wherein the triangles generated according to the determination rule approach to equilateral triangles.

4. The method as claimed in claim 1, wherein the attenuation coefficient K of each point is a ratio of a distance between the point and the light source position to the lighting depth.

5. The method as claimed in claim 1, wherein step (c) comprises:
    (c1) calculating a normal vector of each triangle of the 3D model according to coordinates of three vertices of the triangle;
    (c2) reading original red, green, and blue (RGB) values of the 3D model, and averagely dividing the original RGB values into 90 RGB value intervals, so that each vector intersection angle corresponds to a corresponding RGB value interval;
    (c3) calculating a vector intersection angle between the light ray S and a normal vector of each triangle, and determining an RGB value interval Ith corresponding to the vector intersection angle; and
    (c4) determining a distance between each triangle and the light ray S, determining the attenuation coefficient K of each triangle according to a corresponding distance, and determining an actual display color of each triangle according to an RGB value interval corresponding to an integer part of Ith*K.

6. The method as claimed in claim 5, wherein that the original RGB values are divided into 90 RGB value intervals is according to a rule that an object is visible under the condition that a normal vector intersection angle between the object and the light source is less than 90 degrees.

7. The method as claimed in claim 5, wherein step (d) comprises:
   (d1) determining a display range of a display plane according to a resolution of the display device;
   (d2) determining two-dimensional (2D) coordinates of all the triangles of the 3D model by projecting all the triangles to the display plane; and
   (d3) displaying all the triangles of the 3D model on the display plane according to the 2D coordinates and actual display colors of all the triangles.

8. The method as claimed in claim 7, wherein step (d) further comprises:
   (d4) if 2D coordinates of any triangle exceeds the display range, reducing 2D coordinates of all the triangles by the same proportion, to make sure all the triangles are displayed within the display range.

9. A non-transitory storage medium storing a set of instructions, the set of instructions capable of being executed by a processor to perform a lighting environment simulation method, the method comprising:
   (a) triangulating a three-dimensional (3D) model of an object obtained from a storage device into a plurality of triangles;
   (b) simulating a lighting environment for the 3D model, comprising: (b1) determining a lighting range according to coordinates of a maximum bounding box of the 3D model, (b2) determining a light source position according to coordinates of a center point of an upper surface of the maximum bounding box, (b3) determining a lighting cone according to the light source position and the lighting range, taking a rotation axis of the lighting cone as a light ray S along a lighting direction, and taking a height of the rotation axis as a lighting depth; (b4) dividing the lighting depth into n sections to obtain a set of points on the lighting depth; (b5) calculating a distance between each point on the lighting depth and the light source position; and (b6) calculating an attenuation coefficient K of each point according to a corresponding distance;
   (c) determining an actual display color for each triangle of the 3D model according to an original color of the 3D model, an intersection angle between a light ray S along the lighting direction and a normal vector of the triangle, and a distance between the triangle and the light source position; and
   (d) projecting the 3D model onto a display device according to coordinates and the actual display color of each triangle of the 3D model.

10. The storage medium as claimed in claim 9, wherein step (a) comprises:
   (a1) converting the 3D model to a B-spline curved surface, determining a closed boundary curve of the B-spline curved surface in a parametric plane, and dividing the closed boundary curve by a plurality of horizontal lines and vertical lines, to obtain a plurality of grids;
   (a2) if a grid has no intersection point with the closed boundary curve, generating two triangles by connecting four vertices of the grid anti-clockwise;
   (a3) if a grid has one or more intersection points with the closed boundary curve, adding the one or more intersection points, one or more vertices of the grid which fall in the closed boundary curve, and boundary points of the closed boundary line into a 2D data structure Q1;
   (a4) reading a first point p1 and a second point p2 nearest to the point p1 from the 2D data structure Q1, where p1 and p2 construct one side of a triangle A, and determining a third point p3 of the triangle A according to a determination rule that there is no 2D point of the 2D data structure Q1 in a circumcircle of the triangle A; and
   (a5) determining vertices of other triangles in the 2D data structure Q1 according to the determination rule, to generate the plurality of triangles of the 3D model.

11. The storage medium as claimed in claim 10, wherein the triangles generated according to the determination rule approach to equilateral triangles.

12. The storage medium as claimed in claim 9, wherein the attenuation coefficient K of each point is a ratio of a distance between the point and the light source position to the lighting depth.

13. The storage medium as claimed in claim 9, wherein step (c) comprises:
   (c1) calculating a normal vector of each triangle of the 3D model according to coordinates of three vertices of the triangle;
   (c2) reading original red, green, and blue (RGB) values of the 3D model, and averagely dividing the original RGB values into 90 RGB value intervals, so that each vector intersection angle corresponds to a corresponding RGB value interval;
   (c3) calculating a vector intersection angle between the light ray S and a normal vector of each triangle, and determining an RGB value interval Ith corresponding to the vector intersection angle; and
   (c4) determining a distance between each triangle and the light ray S, determining the attenuation coefficient K of each triangle according to a corresponding distance, and determining an actual display color of each triangle according to an RGB value interval corresponding to an integer part of Ith*K.

14. The storage medium as claimed in claim 13, wherein that the original RGB values are divided into 90 RGB value intervals is according to a rule that an object is visible under the condition that a normal vector intersection angle between the object and the light source is less than 90 degrees.

15. The storage medium as claimed in claim 13, wherein step (d) comprises:
   (d1) determining a display range of a display plane according to a resolution of the display device;
   (d2) determining two-dimensional (2D) coordinates of all the triangles of the 3D model by projecting all the triangles to the display plane; and
   (d3) displaying all triangles of the 3D model on the display plane according to the 2D coordinates and actual display colors of all the triangles.

16. The storage medium as claimed in claim 15, wherein step (d) further comprises:
   (d4) if 2D coordinates of any triangle exceeds the display range, reducing 2D coordinates of all triangles by the same proportion, to make sure all the triangles are displayed within the display range.

* * * * *